US006711129B1

United States Patent
Bauer et al.

(12) United States Patent
(10) Patent No.: US 6,711,129 B1
(45) Date of Patent: Mar. 23, 2004

(54) REAL-TIME ADMISSION CONTROL

(75) Inventors: Eric J. Bauer, Freehold, NJ (US); Gang Yang, Holmdel, NJ (US)

(73) Assignee: Avaya Technology Corp., Basking Ridge, NJ (US)

(*) Notice: Subject to any disclaimer, the term of this patent is extended or adjusted under 35 U.S.C. 154(b) by 0 days.

(21) Appl. No.: 09/427,313

(22) Filed: Oct. 26, 1999

(51) Int. Cl.⁷ ............................................... G01R 31/08
(52) U.S. Cl. ....................... 370/230; 370/229; 370/235
(58) Field of Search ................................ 370/230, 229, 370/231, 232, 233, 234, 235, 252, 253, 389, 230.1, 236.1, 395.2, 395.21, 395.42, 395.43, 401, 420, 421; 709/103, 104, 203, 226, 227, 228, 229, 240

(56) References Cited

U.S. PATENT DOCUMENTS

| | | | | |
|---|---|---|---|---|
| 5,719,854 A | * | 2/1998 | Choudhury et al. | 370/231 |
| 5,745,694 A | * | 4/1998 | Egawa et al. | 709/225 |
| 5,838,663 A | * | 11/1998 | Elwalid et al. | 370/230 |
| 5,946,466 A | * | 8/1999 | Adiga et al. | 709/231 |
| 5,982,748 A | * | 11/1999 | Yin et al. | 370/232 |
| 5,982,750 A | * | 11/1999 | Table et al. | 370/233 |
| 6,046,981 A | * | 4/2000 | Ramamurthy et al. | 370/232 |
| 6,101,547 A | * | 8/2000 | Mukherjee et al. | 709/231 |
| 6,141,322 A | * | 10/2000 | Poretsky | 370/231 |
| 6,189,033 B1 | * | 2/2001 | Jin et al. | 709/225 |
| 6,215,768 B1 | * | 4/2001 | Kim | 370/230 |
| 6,233,223 B1 | * | 5/2001 | Sabry et al. | 370/230 |
| 6,404,735 B1 | * | 6/2002 | Beshai et al. | 370/230 |
| 6,411,601 B1 | * | 6/2002 | Shaffer et al. | 370/230 |

OTHER PUBLICATIONS

Jamin et al., "Comparison of Measurement-based Admission Control Algorithms for Controlled-Load Service", IEEE.*

Mehra et al., "Resource Management for Real-Time Communication: Making Theory Meet Practice", IEEE.*

* cited by examiner

Primary Examiner—Phirin Sam
(74) Attorney, Agent, or Firm—DeMont & Breyer, LLC

(57) ABSTRACT

A real-time admission control scheme is proposed. The real-time admission control scheme of the present invention does not rely on pre-determined threshold limits. Instead, the current resource utilization is evaluated in real time and admission control decisions are based on this real-time evaluation. As soon as a new service request is received, a real-time evaluation of the current resource utilization of each active task (i.e., in all classes, not just the corresponding class) that consumes resources is made. These tasks include the scheduled service requests (e.g., point-to-point calls, conference calls) as well as failure recovery functions. Then, total resource utilization is computed by summing the resource utilization of each active task. Accordingly, a measure of the available system resources is computed.

20 Claims, 3 Drawing Sheets

REAL-TIME ADMISSION CONTROL

BACKGROUND OF THE INVENTION

1. Field of the Invention

The present invention relates to computer or communications systems. More specifically, the invention relates to a scheme for controlling the allocation of system resources on computer and communications systems handling a variety of services such as voice, video, and bursty data transmission.

2. Description of Related Art

In response to rapidly increasing demand for a wide variety of telecommunication services, high-speed, large-capacity computer and communications systems have been proposed. To meet these demands in an efficient and cost-effective manner, a single computer or communications system must be able to handle simultaneously different kinds of telecommunication services and applications having conflicting requirements. Moreover, these services must be accommodated in a manner that constitutes an effective and efficient use of available resources.

A typical computer or communications system generally handles real-time services such as voice, video, and smoothly transmitted data transmissions without significant degrees of latency or jitter. These types of transmissions have short-term, peak bandwidth requirements that are substantially the same as their long-term, average bandwidth requirements. These transmissions are most efficiently handled by allocating their bandwidth requirements in the system for the entire duration of the transmissions along the entire call routing path from the transmitter to the receiver.

A typical system may also handle certain bursty data transmissions that do not have stringent jitter or latency requirements. These kinds of transmissions, however, may involve periods of high rates of data transmissions with long periods of little or no data transmissions. For such transmissions, the short-term, peak bandwidth requirements may be very high compared to long-term, average bandwidth requirements. Allocation of peak bandwidth, as in the case of real-time services mentioned above, would be an inefficient use of system resources, and is not necessary for such bursty data transmissions.

Although bursty data transmissions may not have stringent jitter or latency requirements, they may have stringent loss requirements. Specifically, it is particularly important to keep the probability of packet loss very small. If such probability is not kept very small, the resulting packet retransmissions that are needed to complete the transmissions can overwhelm the network and can cause congestion and even collapse, particularly on systems handling a large amount of communication activity.

Accordingly, there is a need for an effective congestion avoidance scheme, particularly for real-time services that must be handled without significant degrees of latency or jitter. One type of prior art congestion avoidance scheme is based on admission control. An admission control scheme is typically based on a "blackbox" model, wherein static threshold limits are pre-determined and pre-set for each particular class or type of service handled by a system. For example, if the system handles point-to-point calls, conference calls, and video-transmission calls, then the blackbox model places a particular limit or quota on the number of concurrent calls of each class (e.g., 92 point-to-point calls, 4 conference calls and 5 video-transmission calls). In this model, each incoming new service request is evaluated in its corresponding class and if it is determined that the addition of the new service request will cause the number of active service tasks in the corresponding class to exceed the pre-determined threshold, then the new service request is rejected; otherwise, it is accepted.

SUMMARY OF THE INVENTION

Prior art blackbox models base their admission control on a simple comparison of active service tasks in a particular class to the pre-determined threshold limit or quota in that particular class. While this simple comparison may often represent the resource utilization under typical situations, the uncertainty or error between the typical use and the actual usage can produce wide uncertainty bands. These wide uncertainty bands can increase the risk of either squandering resources by unnecessarily denying service to subscribers, or accepting too many requests, and offering inferior, substandard service to subscribers.

Furthermore, the prior art blackbox model does not address situations where the relative number of different types of services differ from the assumptions used to set the blackbox model limits. For example, in the exemplary case where the prior art admission control scheme places a threshold limit of 92 point-to-point calls in a first class and another threshold limit of 4 conference calls in a second class, this admission control scheme prohibits 93 point-to-point calls and only 3 conference calls from being made simultaneously and does not scale well when a new type of service is identified or brought into the system.

Also, the prior art blackbox model fails to consider the unexpected resource utilization by occasional or unscheduled system functions, e.g., system maintenance and back-ups or system failures.

In accordance with the principles of the present invention, a real-time admission control scheme is proposed. The real-time admission control scheme of the present invention does not rely on pre-determined threshold limits. Instead, the current resource utilization is evaluated in real time and admission control decisions are based on this real-time evaluation.

In the present invention, as soon as a new service request is received, a real-time evaluation of the current resource utilization of each active task (i.e., in all classes, not just the corresponding class) that consumes resources is made. These tasks include the scheduled service requests (e.g., point-to-point calls, conference calls) as well as failure recovery functions. Then, total resource utilization is computed by summing the resource utilization of each active task. Accordingly, a measure of the available system resources is computed. For example, if the total resource utilization indicates that 50 MIPS are currently being used out of total usable 150 MIPS, then the measure of the available system resources is 100 MIPS.

In the present invention, each incoming service request may also be assigned a minimum acceptable resource level and the principles of the present invention may be utilized to ensure that this minimum acceptable resource level is provided. In accordance with one embodiment of the present invention, the admission control scheme is programmed with pre-defined minimum acceptable resource level information for each class. Alternatively, the minimum acceptable resource level information may be explicitly embedded within each incoming service request and may be received and evaluated by the admission control scheme when the service request is received by the system.

If the measure of the available system resources indicates that the minimum required resource level cannot be provided, then the incoming service request is rejected; otherwise, the incoming service request is accepted. For example, if the measure of available resources is 50 MIPS and the minimum resource level of the incoming request requires 65 MIPS, the incoming service request will be declined, even though 50 MIPS may be able to support the service, but at an unacceptable, low level.

Thus, in the present invention, the admission control is based on a real-time evaluation of available resources. Accordingly, the threshold limits are based on the real-time measurement of the available system resources and are therefore dynamic in nature. Unlike the prior art schemes, the threshold limits in the present invention are not pre-defined. Furthermore, the admission control decisions are not based on evaluation of active tasks only in a particular class, but can be based on evaluation of all active tasks in the system.

In one embodiment, the present invention is a method for controlling utilization of a system resource, comprising the steps of (a) receiving a request for permission to use the resource by a resource user; (b) measuring, in real time, a current total level of actual utilization of the resource for all resource users; (c) determining a current available level of the resource from the measured current total level of actual utilization; and (d) determining whether to grant the request based on the current available level of the resource.

In another embodiment, the present invention is an admission controller for a computer or communication system having a plurality of resource users for controlling utilization of a system resource, wherein the admission controller is configured to: (a) receive a request for permission to use the resource by a resource user; (b) measure, in real time, a current total level of actual utilization of the resource for all resource users; (c) determine a current available level of the resource from the measured current total level of actual utilization; and (d) determine whether to grant the request based on the current available level of the resource.

Yet, in one more embodiment, the present invention is a machine-readable medium, having encoded thereon program code, wherein, when the program code is executed by a machine, the machine implements a method for controlling utilization of a system resource by an admission controller for a computer or communication system having a plurality of resource users, comprising the steps of (a) receiving a request for permission to use the resource by a resource user; (b) measuring, in real time, a current total level of actual utilization of the resource for all resource users; (c) determining a current available level of the resource from the measured current total level of actual utilization; and (d) determining whether to grant the request based on the current available level of the resource.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
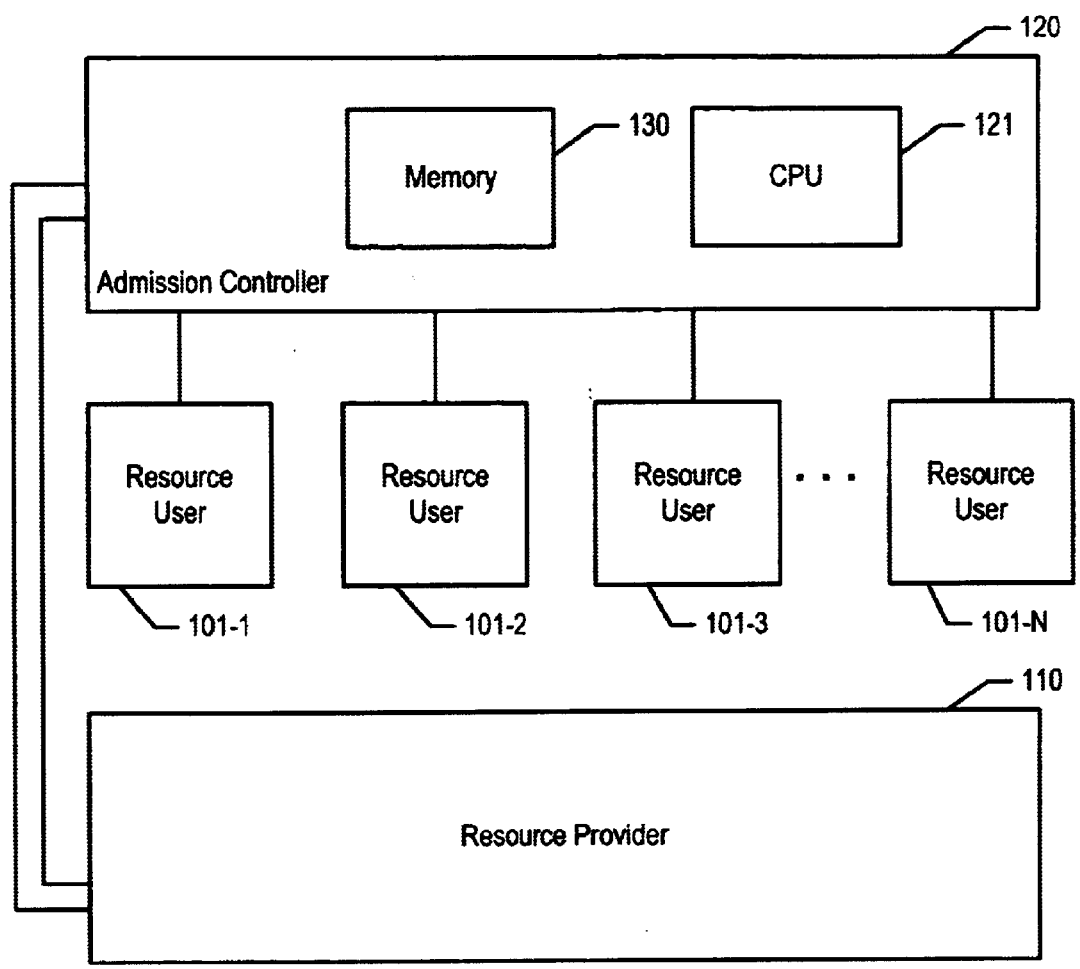
FIG. 1 is illustrates a block diagram illustrating a real-time admission control architecture in accordance with one embodiment of the present invention.

Referring now to FIG. 1, there is shown a block diagram illustrating a real-time admission control architecture in accordance with one embodiment the present invention. In FIG. 1, a total of N resource users 101-1 to 101-N are configured to generate individual requests for access to a resource provider 110. Typically, a resource user is a computer application, process, thread or thread group, task, or data flow; a resource provider is typically a computer operating system or data network. It is assumed that access requests occur independently of each other in an unpredictable (i.e., non-deterministic) manner. All requests, however, seek "admittance" to (i.e., service from) the same resource provider 110, which comprises a limited amount of resources and therefore cannot handle an unlimited number of accepted requests per unit of time.

For example, resource users 101-1 to 101-N may be N call streams, each stream belonging to a different customer and resource provider 110 may be a telecommunications switching network. Alternatively, the N resource users may correspond to N active applications in a window-based personal computer wherein each window is running a different task and the common provider may be a shared personal computer. In another case, the N resource users may correspond to N terminal devices, and the common resource provider may be a shared central processing unit. Other types of resource provider for which the present invention may provide an admission control mechanism include a system handling a pool of attendants, a bandwidth manager, a processor, a telecommunications switch, etc. The possible system resources include, without limitation, transmission bandwidth, processing power, memory space, and network capacity.

Admission requests (i.e., requests for service) from each of the resource users 101-1 to 101-N are handled by an admission controller 120 which operates independently (i.e., without knowledge) of any pre-determined or pre-set threshold limits. If admission controller 120 determines that sufficient resources are available, then the request is accepted and the associated resource user is allowed to access resource provider 110. Otherwise, the access request is not allowed but is rather rejected.

Admission controller 120 may include a central processing unit (CPU) 121 which may perform mathematical and logical operations on parameters stored in a memory 130. Memory 130 also stores instructions for performing sequences of process steps, such as those steps in FIG. 2 below. Memory 130 may include the pre-assigned values of minimum acceptable resource level for each class of service.

Admission controller 120 evaluates an incoming service request and determines the corresponding minimum acceptable resource level. Admission controller 120 then determines a measure of the currently available resources and compares the minimum acceptable resource level to the measure of available resources. If it is determined that the minimum acceptable resource level can be satisfied with the available resources, then the service request is accepted; otherwise, the service request is rejected.

Figure 2:
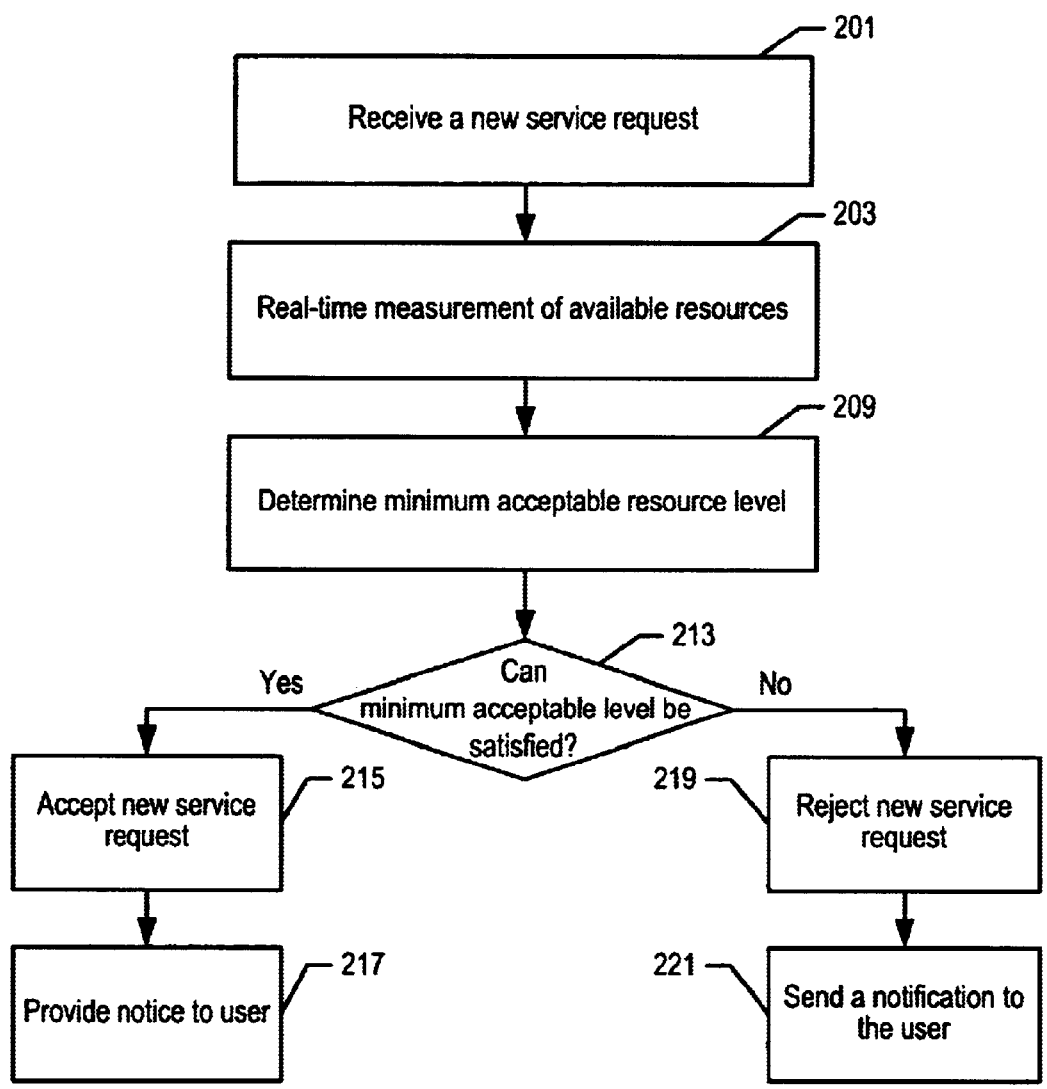
FIG. 2 illustrates an overall process performed in the admission control block of FIG. 1 in accordance with one embodiment of the present invention.

FIG. 2 illustrates the overall process performed in admission controller 120 in accordance with one embodiment of the present invention. The process starts in block 201 when a new service request is received by admission controller 120 from a particular resource user. Next admission controller 120 makes a real-time evaluation of the current usage of the system resources to determine a measure of the available system resources (block 203).

There are many ways to measure the available system resources. In one embodiment, admission controller 120 contacts resource provider 110 and receives a list of all active tasks including service tasks and maintenance/repair functions currently being handled by the resource provider. Admission controller 120 then determines total resource utilization by summing the resource utilization by each active task. Admission controller 120 then computes a measure of available system resources from the difference between the total level of system resources and the total resource utilization.

In an alternative embodiment, instead of admission controller 120, resource provider 110 measures the available system resources. Admission controller 120 queries resource provider 110 for the measurement of available system resources. In yet another embodiment, admission controller 120 contacts each resource user 101–1 to 101–N to receive resource utilization for each resource user. Admission controller 120 then computes a total resource utilization by summing the resource utilization by each resource user. Accordingly, admission controller determines available resources.

A value of the corresponding minimum acceptable resource level is also determined (block 209). The minimum acceptable resource level may be a parameter stored in memory 130 or may be a parameter received along with the service request in block 201. The available resources are then compared to the value of the minimum acceptable resource level assigned to the service request to determine whether the minimum acceptable resource level of the incoming request can be satisfied (block 213). If the comparison of the value of available resources to the value of the minimum acceptable resource level shows that the minimum acceptable resource level can be satisfied, the incoming service request is accepted (block 215) and notice is provided to the service user that access to the requested resources in resource provider 110 has been provided (block 217). If the comparison of the value of available resources to the value of the minimum acceptable resource level shows that the minimum acceptable resource level cannot be satisfied, the incoming service request is rejected (block 219) and a notification is sent to the service user that the service request cannot be accepted (block 221).

Figure 3:
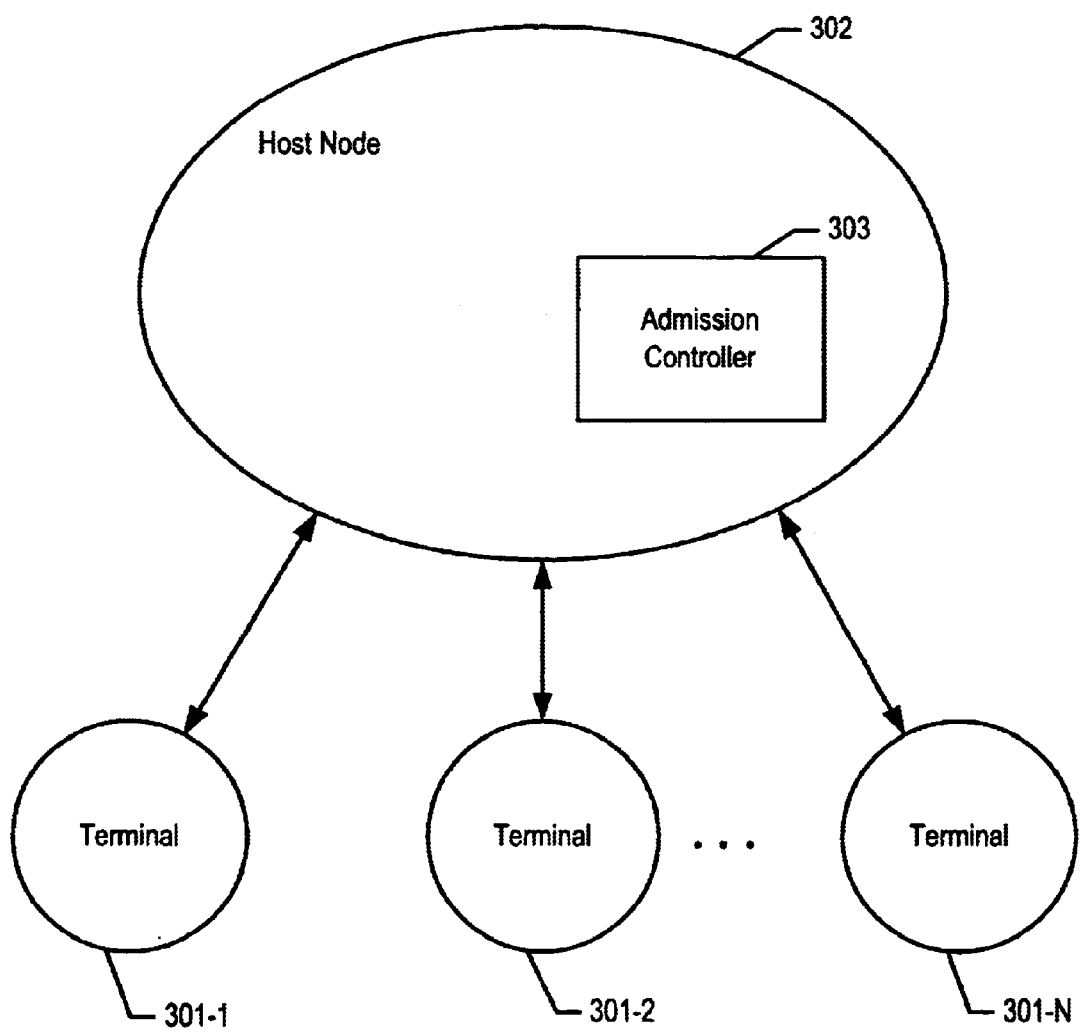
FIG. 3 illustrates a system in accordance with one embodiment of the present invention.

FIG. 3 illustrates a system 300 in accordance with another embodiment of the present invention wherein the resource provider is a host node 302 and resource users are medium terminals 301-1 to 301-N. Host node 302 is directly or indirectly connected to various medium terminals 301 such as data terminals, voice terminals, and/or picture terminals. Host node 302 may also be a computer capable of handling various services including audio, voice, and data transmission. Host node 302 facilitates communication between various medium terminals 301.

According to the present invention, an admission controller 303 is implemented within host node 302 for controlling service requests sent from medium terminals 301. Admission controller 303 receives one or more service requests from one or more medium terminals 301 and decides whether to grant or reject each incoming service request. Admission controller 303 bases its decision on a plurality of factors including the current availability of system resources, and the nature of the requested service.

Each incoming service request also has a predefined minimum acceptable resource level which must be provided by system 300 in order to maintain the quality of the service at an acceptable level. Admission controller 303 has knowledge of the corresponding minimum acceptable resource level. Admission controller 303 may be programmed with predefined parameters defining minimum acceptable resource levels for all relevant resources. Alternatively, each incoming service request may be embedded with the corresponding minimum acceptable resource level information. This minimum acceptable resource level information may be received and evaluated by admission controller 303 at the time the service request reaches host node 302.

When an incoming service request is received by host node 302, admission controller 303 measures the available system resources. A real-time evaluation of all activities that consume trivial and non-trivial resources is made. The evaluation includes measuring or estimating resource consumption by all assigned tasks (e.g., in-progress real-time and bursty transmissions) as well as additional unassigned (e.g., unscheduled) active tasks. Examples of unassigned activities include system maintenance tasks and troubleshooting tasks. Then, a total resource utilization is computed by determining current resource utilization by each activity. Accordingly, a corresponding value of available resources is computed.

Then, the incoming service request is evaluated to determine the resources necessary to satisfy the service request and to meet the corresponding minimum acceptable resource level. If the value of available system resources indicates that the assigned minimum acceptable resource level can be satisfied then the incoming service request is accepted; otherwise, the incoming service request is rejected.

This ensures that an acceptable level quality of service provided by system 300 is maintained and the system is not placed in a congestion state. Congestion can affect both the real-time and the bursty services, but real-time services are particularly sensitive to congestion in the system. These types of transmissions may have stringent short-term, peak bandwidth requirements and any congestion in the network can cause unacceptable latency and inter-packet jitter.

The principles of the present invention may be utilized in a wide range of applications. For example, consider a telecommunications network that can handle a limited number of real-time and bursty services. The network receives packet traffic from numerous customers having communications and business needs that differ from each other and change with time. The customers are willing to pay for different levels of service quality, which must be guaranteed by the network provider. Fox example, the telecommunications network may be handling video transmission (i.e., a real-time service) as well as e-mail transmission (i.e., a bursty data service). Both of these services have different demands and requirements which are affected by the current system resource utilization.

In the foregoing scenario, the demand imposed on the network varies in some random fashion, since the customers originate traffic independently of each other. This inherent randomness gives rise to a conflict between the desire to run an efficient network operation and the need to guarantee every customer a minimum level of service quality. The same problem exists in data processing environments, wherein bandwidth in a communication channel, processing time in a CPU, and/or other system resources are shared. In the present invention, an efficient, a real-time admission control scheme is provided which is applicable in the above-described situations.

For example, if each telephone call passing through a particular server requires 4 MIPS, and each conference call requires 10 MIPS per participant, then 16 calls and 1 three-way conference call would consume 94 MIPS. In the same example, assume further that the particular server can handle 100 MIPS.

In this example, in accordance with the principles of the present invention, a request for a new telephone call will be accepted, but a request to add another user to the existing conference will be rejected because the real-time measurement of system resources utilization indicates that addition of a PSTN call will result in 94+4=98 MIPS (<100) utilization and the available acceptable resource level is 100 MIPS. But the addition of another user to the existing conference will be declined, because this addition will result in 94+10=104 MIPS (>100) total resource utilization indicating that the required resource level is not available.

In another example, the principles of the present invention may be utilized in a personal computer having a multi-task windowed environment. In the prior art, there may be a predetermined limit on how many tasks may be simultaneously operated (e.g., a maximum number of open windows). But, in actual processing, as additional tasks are added, the quality of the active and new tasks continues to degrade (e.g., becomes slower). This increased latency can be catastrophic for real-time services, e.g., video transmissions. According to the present invention, before a new task is scheduled (e.g., a new window is opened), a real-time evaluation of all active tasks is taken to compute a measure of available resources. Based on this real-time measurement, a decision is made whether to permit addition of new tasks.

Thus, the real-time admission control scheme in accordance with the principles of the present invention results in efficient utilization of resources when compared to the prior art schemes. The prior art schemes are based on the notion that each class (e.g., telephone calls or conference calls) has static limits. These schemes fail to consider the intermittent nature of certain classes of service (e.g., bursty data transmissions). They also fail to consider other non-trivial tasks which consume system resources. The principles of the present invention do not rely on pre-defined limits of each class, and instead, rely on a value of available resources which is measured in real-time. This implies that the threshold limits are dynamic and are changed at each measurement, e.g., a $93^{rd}$ point-to-point call may admitted in one situation and may be rejected in another situation, because, at the second time, the system is running a backup operation which consumes resources unexpectedly.

The present invention is also applicable in a plurality of resource-sharing situations. Resource-sharing situations generally involve one or more "resource users," each containing multiple "customers." Each customer is a source of a series or stream of "request". Each customer requires a number of units from the resource providers, which may be zero, one, or greater than one, and may be different for different customers.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A method comprising:
   (a) receiving a request from a resource user to use a resource, wherein said request is associated with a respective one of a plurality of classes of service;
   (b) measuring the current total resource utilization by summing up the resource utilizations of all active tasks for all of said classes of service;
   (c) determining the current resource availability based on the measured current total resource utilization; and
   (d) determining whether to grant the request based on the current resource availability.

2. The method of claim 1, further comprising transmitting a response to the resource user based on (d).

3. The method of claim 1, wherein (d) comprises comparing the current resource availability to a minimum acceptable resource level for the resource user.

4. The method of claim 3, wherein the request explicitly identifies the minimum acceptable resource level.

5. The method of claim 1, wherein said current total resource utilization is associated with a possibly empty set of currently-served resource users.

6. The method of claim 1, wherein the resource is transmission bandwidth.

7. The method of claim 1, wherein the resource is processing power.

8. The method of claim 1, wherein the resource is memory space.

9. The method of claim 1, wherein the resource is network capacity.

10. The method of claim 5, wherein (b) comprises querying each of said currently-served resource users to determine a respective current resource utilization for each of said currently-served resource users.

11. The method of claim 5, wherein (b) comprises querying a provider of the resource to determine a respective current resource utilization for each of said currently-served resource users.

12. The method of claim 1, wherein (b) comprises querying a provider of the resource to determine the current total resource utilization.

13. A machine-readable medium, having encoded thereon program code, wherein, when the program code is executed by a machine, the machine implements a method comprising:
   (a) receiving a request from a resource user to use a resource, wherein said request is associated with a respective one of a plurality of classes of service;
   (b) measuring the current total resource utilization by summing up the resource utilizations of all active tasks for all of said classes of service;
   (c) determining the current resource availability based on the measured current total resource utilization; and (d) determining whether to grant the request based on the current resource availability.

14. An apparatus comprising:
a receiver for receiving a request from a resource user to use a resource, wherein said request is associated with a respective one of a plurality of classes of service;
a monitor for measuring the current total resource utilization by summing up the resource utilizations of all active tasks for all of said classes of service; and a processor for:
   (i) determining the current resource availability based on the measured current total resource utilization; and
   (ii) determining whether to grant the request based on the current resource availability.

15. The apparatus of claim 14 further comprising a transmitter for sending a response to said resource user based on (ii).

16. The apparatus of claim 14, wherein said processor is also for comparing said current available level of said resource to a minimum acceptable resource level for the resource user.

17. The apparatus of claim 14, wherein said request explicitly identifies said minimum acceptable resource level.

18. The apparatus of claim 14, wherein said resource is transmission bandwidth.

19. The apparatus of claim 14, wherein said current total level of actual utilization of said resource is associated with a possibly empty set of currently-served resource users.

20. The apparatus of claim 19 further comprising a database for storing:
said minimum acceptable resource level; and
minimum acceptable resource levels for each of said currently-served resource users.

* * * * *